United States Patent
Hirunuma et al.

(10) Patent No.: US 6,930,829 B2
(45) Date of Patent: Aug. 16, 2005

(54) STRUCTURE FOR ASSEMBLY OF BINOCULAR TELESCOPE WITH PHOTOGRAPHING FUNCTION

(75) Inventors: Ken Hirunuma, Tokyo (JP); Keiichi Hotta, Tokyo (JP); Gouji Funatsu, Saitama (JP)

(73) Assignee: PENTAX Corporation, Tokyo (JP)

( * ) Notice: Subject to any disclaimer, the term of this patent is extended or adjusted under 35 U.S.C. 154(b) by 89 days.

(21) Appl. No.: 10/355,042

(22) Filed: Jan. 31, 2003

(65) Prior Publication Data

US 2003/0151807 A1 Aug. 14, 2003

(30) Foreign Application Priority Data

Feb. 12, 2002 (JP) ..................................... P2002-033384

(51) Int. Cl.$^7$ .............................................. G02B 23/00
(52) U.S. Cl. ......................... 359/412; 359/408; 396/432
(58) Field of Search ................................ 359/407, 408, 359/409, 411, 412, 417, 418, 432, 363, 474, 817; 396/429, 432

(56) References Cited

U.S. PATENT DOCUMENTS

| 4,067,027 A | 1/1978 | Yamazaki | 396/432 |
|---|---|---|---|
| D259,569 S | 6/1981 | Nishioka | D16/133 |
| D262,632 S | 1/1982 | Yamazaki | D16/208 |
| D265,479 S | 7/1982 | Yamazaki | D16/208 |
| 6,014,253 A | 1/2000 | Funatsu | 359/418 |
| 6,088,053 A | 7/2000 | Hammack et al. | 348/61 |
| 6,476,963 B1 | 11/2002 | Chen | 359/412 |
| 2001/0028498 A1 | 10/2001 | Haga et al. | 359/407 |
| 2001/0046085 A1 | 11/2001 | Boys et al. | 359/410 |

FOREIGN PATENT DOCUMENTS

| GB | 2381152 | 4/2002 |
|---|---|---|
| GB | 2380266 | 4/2003 |
| JP | 6-2330 | 1/1994 |
| JP | 2001-281555 | 10/2001 |
| WO | 01/52531 | 7/2001 |

Primary Examiner—Mark A. Robinson
Assistant Examiner—Alessandro Amari
(74) Attorney, Agent, or Firm—Greenblum & Bernstein, P.L.C.

(57) ABSTRACT

A structure for assembly of a binocular telescope with a photographing function, comprises a lower frame, an upper frame, and an engaging mechanism. A pair of telescopic optical systems is mounted on the lower frame. A photographing unit is mounted on the upper frame. A first part of the engaging mechanism is provided on the lower frame. A second part of the engaging mechanism is provided on the upper frame. The first part and the second part are connected by assembling the upper frame onto the lower frame in such a manner that the photographing unit is placed between the pair of telescopic optical systems.

9 Claims, 10 Drawing Sheets

STRUCTURE FOR ASSEMBLY OF BINOCULAR TELESCOPE WITH PHOTOGRAPHING FUNCTION

BACKGROUND OF THE INVENTION

1. Field of the Invention

The present invention relates to a binocular telescope with a photographing function.

2. Description of the Related Art

As is well known, a binocular telescope is used for watching sports, wild birds, and so on. When using such a binocular telescope, it is often the case that the user sees something that he or she would like to photograph. Typically, he or she will fail to photograph the desired scene because he or she must change a camera for the binocular telescope and during this time the chance is lost. For this reason, a binocular telescope containing a camera is proposed, whereby a photograph can be taken immediately by using the camera contained in the binocular telescope while continuing the observation through the binocular telescope.

For example, Japanese Laid-Open Utility Model Publication (KOKAI) No. 6-2330 discloses a binocular telescope with a photographing function, i.e., a combination of a binocular telescope and a camera, in which the camera is simply mounted on the binocular telescope. The binocular telescope is provided with a pair of telescopic optical systems for observing an observed object in an enlarged state, and a photographing optical system for photographing the observed object. Thus, the binocular telescope with the camera is formed by simply combining them, and therefore the whole structure is bulky.

SUMMARY OF THE INVENTION

Therefore, an object of the present invention is to provide an assembly structure for the binocular telescope which is compact and can reduce the manufacturing cost of the binocular telescope.

According to the present invention, there is provided an assembly structure of a binocular telescope with a photographing function, the assembly structure comprising a lower frame, an upper frame, and an engaging mechanism that is provided between the lower frame and the upper frame.

The lower frame supports a pair of telescopic optical systems. The upper frame supports a photographing unit containing a photographing optical system. The engaging mechanism has a first part provided on a side of the pair of telescopic optical systems and a second part provided on a side of the photographing unit. The first part and the second part are connected by assembling the upper frame onto the lower frame in such a manner that the photographing unit is housed in a recess formed between the pair of telescopic optical systems.

Preferably, the assembly structure further comprises a rotary wheel rotatably supported by the photographing unit to focus the pair of telescopic optical systems, so that the engaging mechanism is formed as a movement-conversion mechanism for the telescopic optical systems, that converts a rotational movement of the rotary wheel into a focusing movement of the pair of telescopic optical systems.

The first part of the engaging mechanism of the movement-conversion mechanism for the telescopic optical systems may comprise support members which are provided on the lower frame to move along the optical axes of the pair of telescopic optical systems, and on which parts of the pair of telescopic optical systems are mounted so that the pair of telescopic optical systems perform the focusing movement, and a connecting mechanism which connects the support members to each other so that the support members are unitedly moved. In such a structure, the first part and the second part of the engaging mechanism of the movement-conversion mechanism for the telescopic optical systems are connected by engaging the second part with the connecting mechanism when assembling the upper frame onto the lower frame.

The second part of the engaging mechanism of the movement-conversion mechanism for the telescopic optical systems may comprise a moving element that moves along the optical axes of the pair of telescopic optical systems when the rotary wheel is rotated. In such a structure, the moving element is engaged with the connecting mechanism when assembling the upper frame onto the lower frame.

Preferably, the lower frame comprises plates that are movable relative to each other to adjust the distance between the optical axes of the pair of telescopic optical systems. The support members are provided on the plates, and the connecting mechanism can extend and contract in accordance with the relative movement of the plates.

The photographing unit may be provided with a fixing member for fixing the photographing unit to one of the plates of the lower frame.

The rotary wheel may comprise a rotary wheel cylinder, in which the photographing optical system is housed. In this case, the photographing optical system may be mounted in a lens barrel provided in the rotary wheel cylinder, and a movement-conversion mechanism for a photographing optical system, which converts a rotational movement of the rotary wheel cylinder into a focusing movement of the lens barrel to focus the photographing optical system, is provided between the rotary wheel cylinder and the lens barrel.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
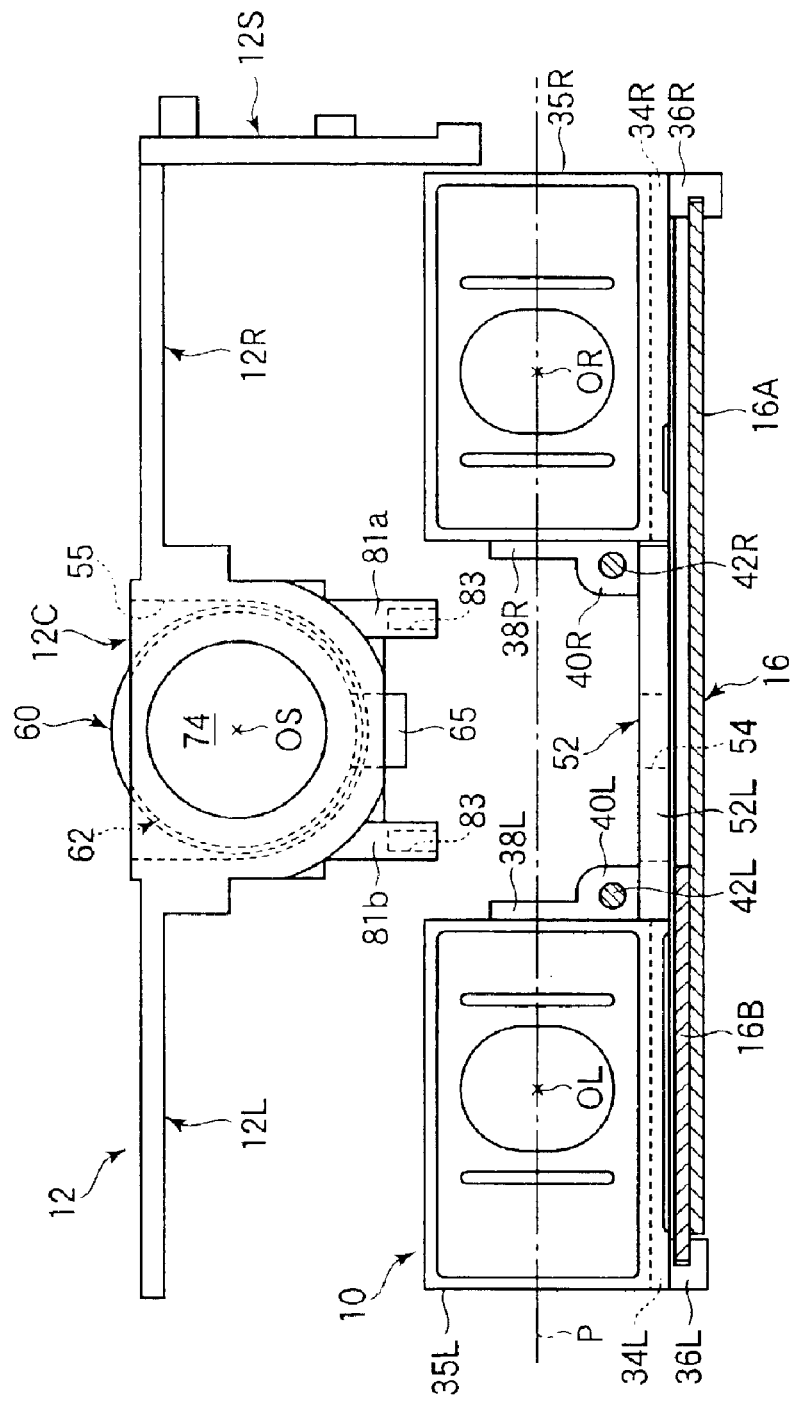
FIG. 1 is an elevational view of an embodiment of the present invention, showing a state in which an upper frame and a lower fame of a binocular telescope with a photographing function are not assembled yet.

The present invention will be described below with reference to the embodiments shown in the drawings.

Figure 2:
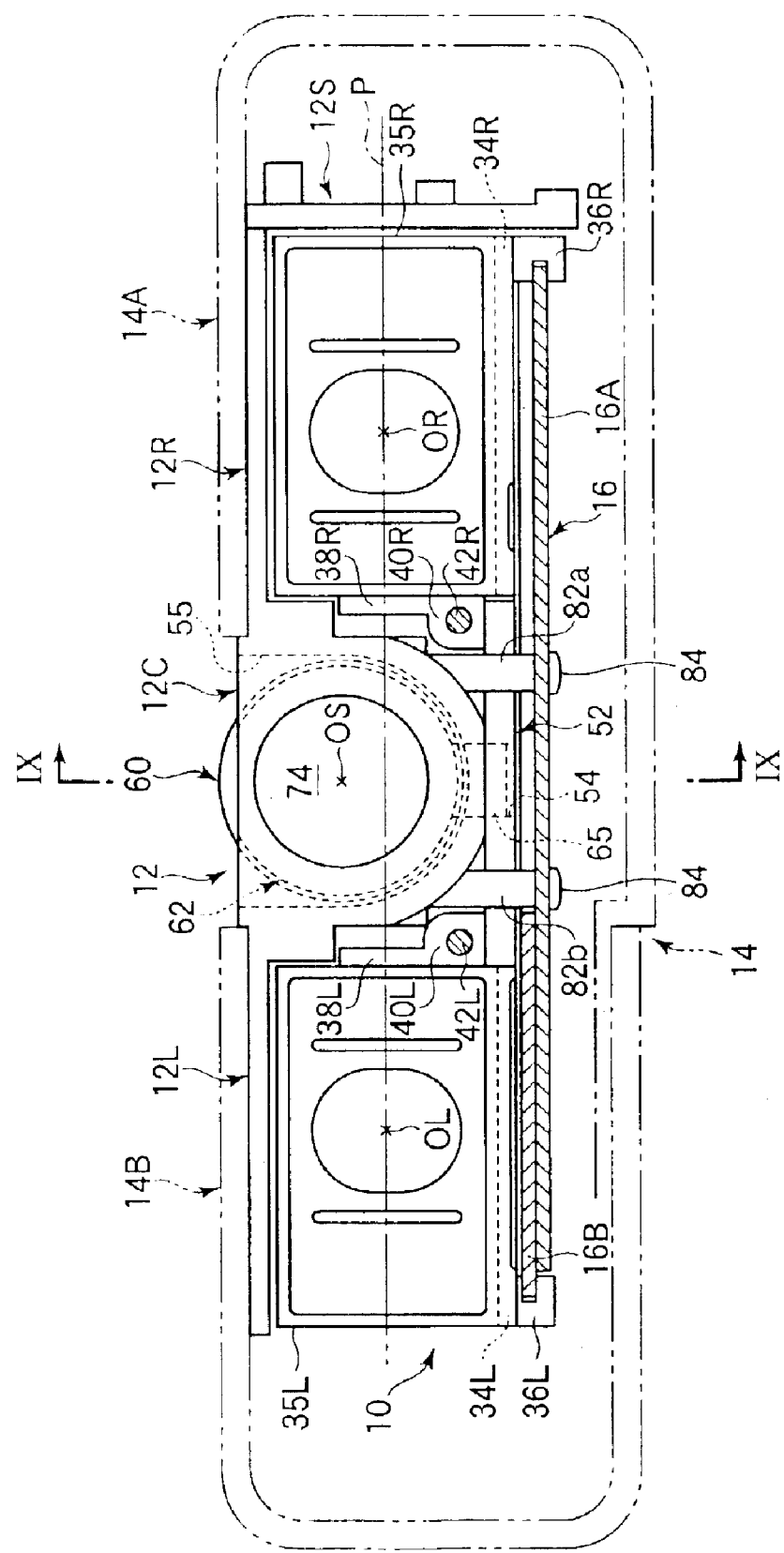
FIG. 2 is an elevational view showing a state in which the upper frame and the lower frame are assembled.

FIGS. 1 and 2 are elevational views showing elements housed in a casing of a binocular telescope with a photographing function, i.e., a binocular telescope containing a digital camera. The elements include a lower frame 10 and an upper frame 20. In FIG. 1, the lower frame 10 and the upper frame 20 have not been assembled yet, and in FIG. 2, the frames 10 and 20 have been assembled.

After the lower frame 10 and the upper frame 20 are assembled as indicated in FIG. 2, the assembled structure is mounted in the casing 14 of the binocular telescope. The casing 14 is box-like, the transverse sectional shape of which is indicated by the chain double-dashed lines in FIG. 2.

The casing 14 is composed of a main casing section 14A and a movable casing section 14B. The movable casing section 14B is slidably engaged with the main casing section 14A such that the movable casing section 14B can be moved relatively to the main casing section 14A. Namely, the movable casing section 14B is movable between a retracted position shown in FIG. 2, and a maximum-extended position in which the movable casing section 14B is pulled out from the retracted position.

A suitable friction force acts on the sliding surfaces of both the casing sections 14A and 14B, and thus a certain extension or contraction force must be exerted on the movable casing section 14B before the movable casing section 14B can be extended from or contracted onto the main casing section 14A. Thus, it is possible for the movable casing section 14B to hold or stay still at an optical position between the fully retracted position (FIG. 2) and the maximum-extended position, due to the suitable friction force acting on the sliding surface of both the casing sections 14A and 14B.

Figure 3:
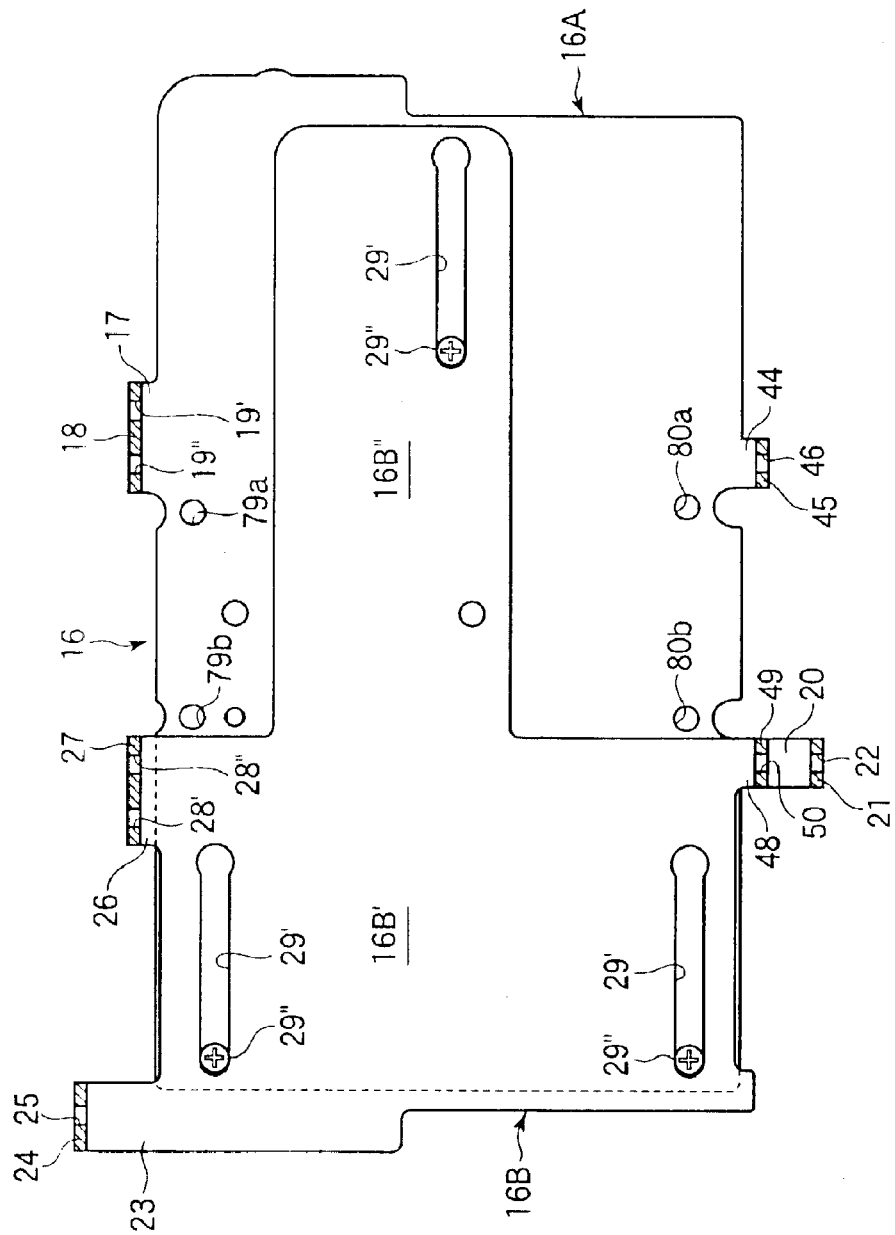
FIG. 3 is a plan view of a support-plate assembly which is a main part of the lower frame.

The lower frame 10 contains a support-plate assembly 16, which is composed of a rectangular plate 16A and a slide plate 16B slidably disposed on the rectangular plate 16A, as shown in FIG. 3. The rectangular plate 16A is fixed to the main casing section 14A, and the slide plate 16B is fixed to the movable casing section 14B. The slide plate 16B has a rectangular portion 16B', having approximately the same breadth as the rectangular plate 16A, and an extending portion 16B", integrally connected to and extending rightward (in FIG. 3) from the rectangular portion 16B'.

A projecting portion 17 is extended from an upper periphery (in FIG. 3) of the rectangular plate 16A so as to fix the rectangular plate 16A to the main casing section 14A. An upright fragment 18 is formed on the projecting portion 17 by bending it. In FIG. 3, the upright fragment 18 is indicated as a sectional view, and two holes 19' and 19" are formed in the upright fragment 18. Further, other projecting portion 20 is extended from a lower periphery (in FIG. 3) of the rectangular plate 16A and an upright fragment 21 is formed on the projecting portion 20 by bending it. The upright fragment 21 is also indicated as a sectional view, and a hole 22 is formed in the upright fragment 21.

Thus, screws (not shown) are inserted in the holes 19' and 22 of the upright fragments 18 and 21 and threaded in the main casing section 14A, so that the rectangular plate 16A is fixed to the main casing section 14A. Note that the other hole 19" of the upright fragment 18 is used for the other object as described later.

A projecting portion 23 is extended from an upper-left corner (in FIG. 3) of the rectangular portion 16B' so as to fix the slide plate 16B to the movable casing portion 14B, and an upright fragment 24 is formed on the projecting portion 23 by bending it. In FIG. 3, the upright fragment 24 is indicated as a sectional view, and a hole 25 is formed in the upright fragment 24. Further, another projecting portion 26 is extended from an upper periphery (in FIG. 3) of the rectangular portion 16B' of the slide plate 16B, and an upright fragment 27 is formed on the projecting portion 26 by bending it. The upright fragment 27 is also indicated as a sectional view, and holes 28' and 28" are formed in the upright fragment 27.

Thus, screws (not shown) are inserted in the holes 25 and 28' of the upright fragments 24 and 27 and threaded in the movable casing section 14B, so that the slide plate 16B is fixed to the movable casing section 14B. Note that the other hole 28" of the upright fragment 27 is used for another object as described later.

Two guide slots 29' are formed in the rectangular portion 16B' of the slide plate 16B, and another guide slot 29' is formed in the extending portion 16B". The three guide slots 29' are parallel to each other, and extend in the right and left direction (in FIG. 3) by the same length. Guide pins 29" fixed on the rectangular plate 16A are slidably engaged in the guide slots 29'. The length of each of the guide slots 29' corresponds to a movable distance of the movable casing section 14B relative to the main casing section 14A, i.e., the distance between the retracted position of the movable casing section 14B (FIG. 2) and the maximum-extended position of the movable casing section 14B. Thus, when the movable casing section 14B is moved in the right or left direction relative to the main casing section 14A, the slide plate 16B is also moved relative to the rectangular plate 16A.

Figure 4:
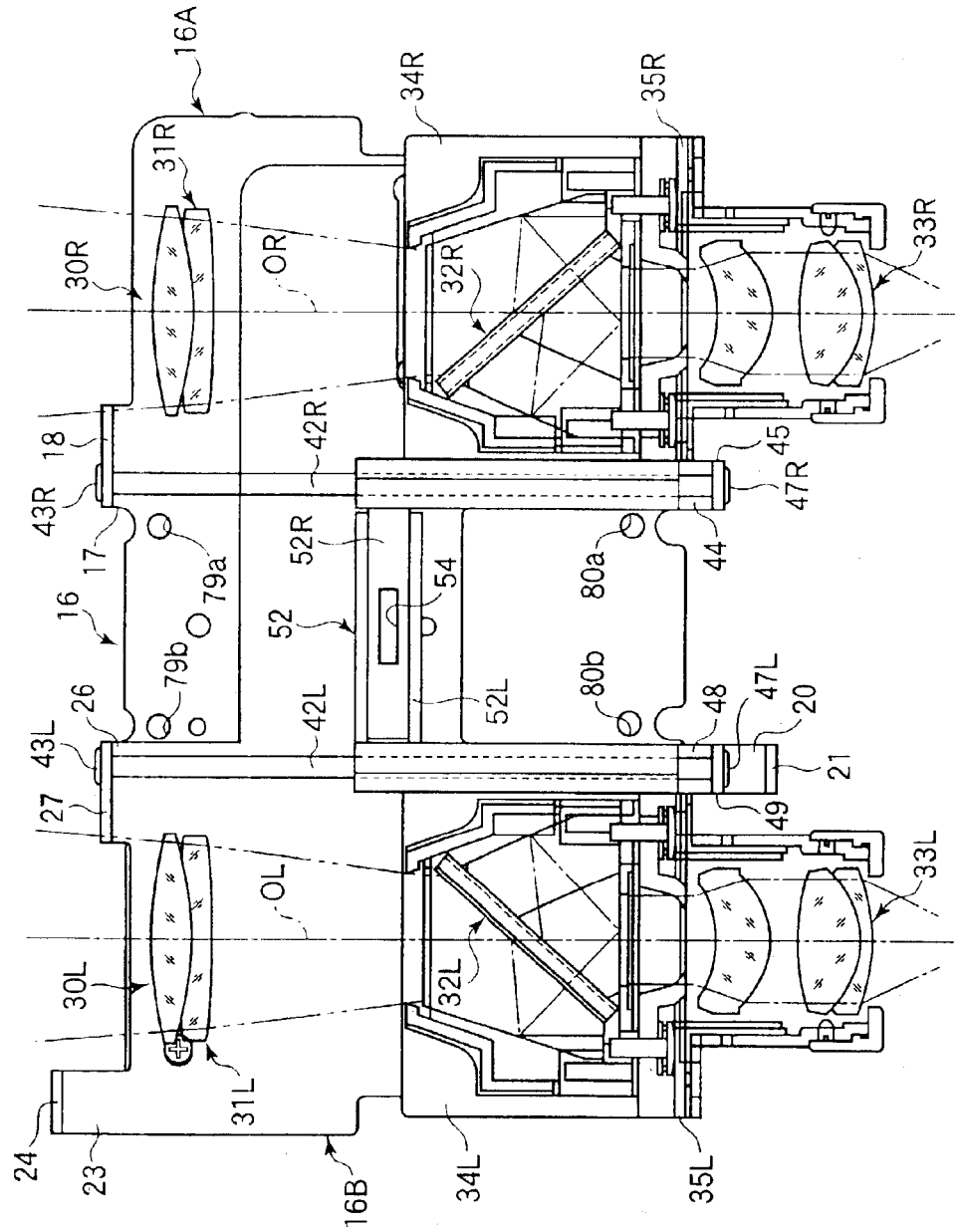
FIG. 4 is a plan view showing a pair of telescopic optical systems mounted on the support-plate assembly.

As shown in FIG. 4, the support-plate assembly 16 is used for mounting a pair of telescopic optical systems 30R and 30L, which have a symmetrical structure and form the binoculars. The telescopic optical system 30R is a right telescopic optical system for the right eye of the user. The telescopic optical system 30R is mounted on the rectangular plate 16A, and contains an objective lens system 31R, an erecting prism system 32R, and an ocular lens system 33R. The telescopic optical system 30L is a left telescopic optical system for the left eye of a user. The telescopic optical system 30L is mounted on the slide plate 16B, and contains an objective lens system 31L, an erecting prism system 32L, and an ocular lens system 33L. As understood from the above description, when the movable casing section 14B is moved relative to the main casing section 14A, the slide plate 16B is also moved relative to the rectangular plate 16A, so that the distance between the optical axes of the pair of telescopic optical systems 30R and 30L, i.e., interpupillary distance of a user, is adjusted.

Note that for simplicity of explanation, in the following description, movement back and forth is respectively defined as movement in the direction of the objective lens system and movement in the direction of the ocular lens system, relative to the pair of telescopic optical systems 3OR and 30L.

The objective lens system 31R of the right telescopic optical system 30R is fixed on the rectangular plate 16A, and the erecting prism system 32R and the ocular lens system 33R can be moved back and forth with respect to the objective lens system 31R, so that the right telescopic optical system 30R can be focused. Similarly, the objective lens system 31L of the left telescopic optical system 30L is fixed on the slide plate 16B, and the erecting prism system 32L and the ocular lens system 33L can be moved back and forth with respect to the objective lens system 31L, so that the left telescopic optical system 30L can be focused.

Figure 5:
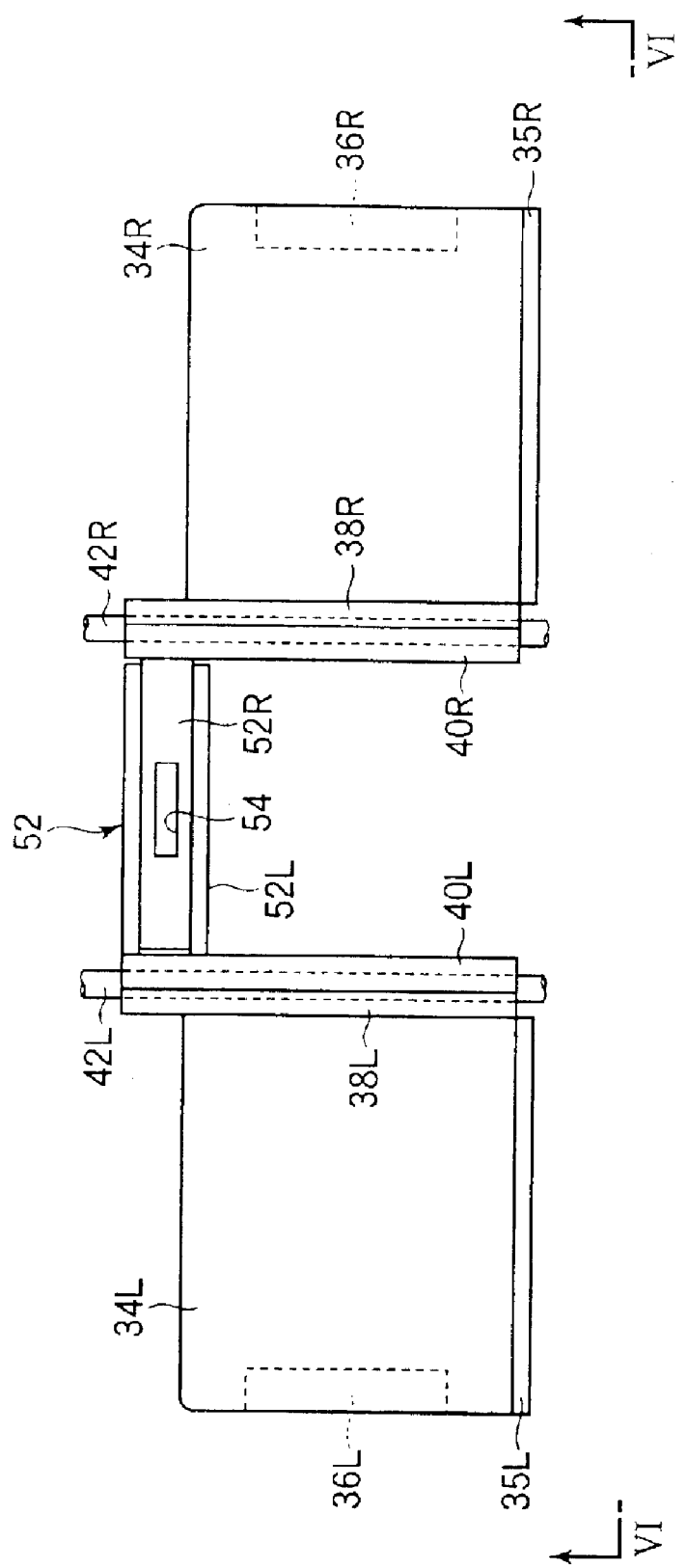
FIG. 5 is a plan view showing mount plates on which the erecting prism systems and ocular lens systems contained in a pair of telescopic optical systems are mounted.
Figure 6:
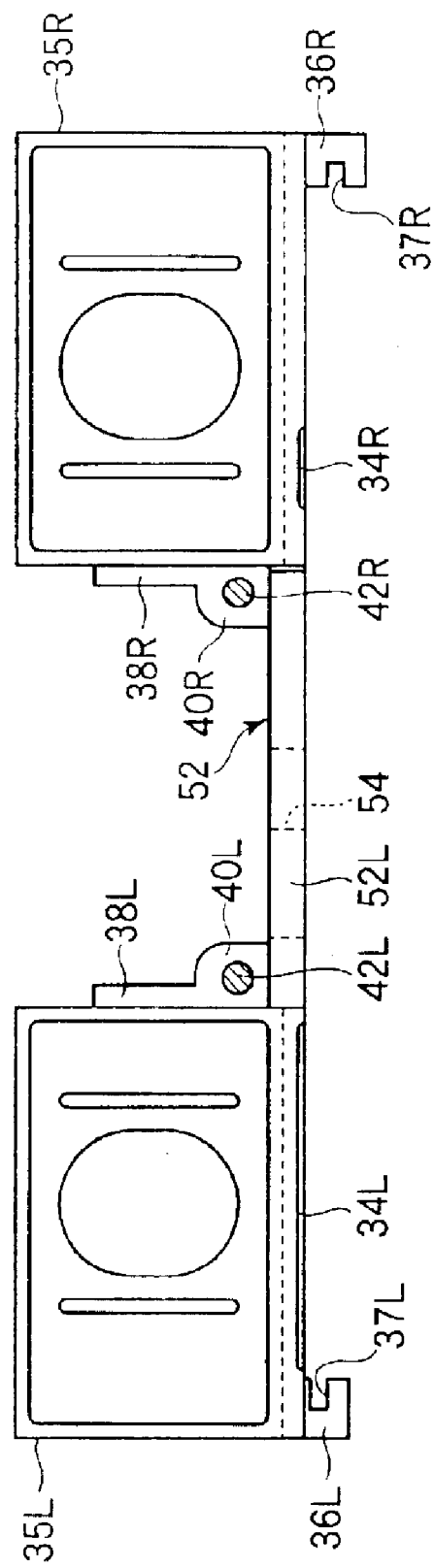
FIG. 6 is an elevational view observed along line VI—VI of FIG. 5.

A right mount plate 34R and a left mount plate 34L, indicated in FIG. 5, are provided for focusing the pair of telescopic optical systems 30R and 30L as describe above. The right mount plate 34R is disposed on the rectangular plate 16A to be movable back and forth, and as shown in FIG. 4, the erecting prism system 32R of the right telescopic optical system 30R is mounted on the right mount plate 34R. As shown in FIGS. 5 and 6, an upright plate 35R is provided along a rear periphery of the right mount plate 34R. The right ocular lens system 33R is attached to the upright plate 35R, as shown in FIG. 4.

Similarly, a left mount plate 34L is disposed on the slide plate 16B to be movable back and forth. Further, as shown in FIG. 4, the erecting prism system 32L of the left telescopic optical system 30L is mounted on the left mount plate 34L. As shown in FIGS. 5 and 6, an upright plate 35L is provided along a rear periphery of the left mount plate 34L. The left ocular lens-system 33L is attached to the upright plate 35L, as shown in FIG. 4.

As shown in FIGS. 5 and 6, the right mount plate 34R is provided with a guide shoe 36R secured to the underside thereof in the vicinity of the right side edge thereof. The guide shoe 36R is formed with a groove 37R, which slidably receives a right side edge of the rectangular plate 16A, as shown in FIG. 2. Also, the right mount plate 34R has a side wall 38R provided along a left side edge thereof, and a lower portion of the side wall 38R is formed as a swollen portion 40R having a through bore for slidably receiving a guide rod 42R.

As shown in FIG. 4, the guide rod 42R extends in the back and forth directions of the rectangular plate 16A, and the front end thereof is securely supported by the rectangular plate 16A. Namely, a female thread hole is formed in the front end of the guide rod 42R, and a screw 43R is inserted in the hole 19" (FIG. 3) of the upright fragment 18 and threaded in the female thread hole, so that the front end of the guide rod 42R is fixed to the rectangular plate 16A.

The rear end of the guide rod 42R is securely supported by the rectangular plate 16A in a similar way as the above. Namely, as shown in FIG. 3, a projection 44 is projected from a rear end portion of the rectangular plate 16A, and an upright fragment 45 is formed by bending the projection 44. In FIG. 3, the upright fragment 45 is indicated as a sectional view, and a hole 46 is formed in the upright fragment 45 to align with the hole 19" of the upright fragment 18. A female thread hole is formed in the rear end of the guide rod 42R, and a screw 47R (FIG. 4) is inserted in the hole 46 of the upright fragment 45 and threaded in the female thread hole, so that the rear end of the guide rod 42R is fixed to the rectangular plate 16A.

Thus, the right mount plate 34R can be moved back and forth along the guide rod 42R, so that the distances from the erecting prism system 32R and the ocular lens system 33R to the objective lens system 31R is adjusted, and thus the right telescopic optical system 30R is focused.

Similarly, as shown in FIGS. 5 and 6, the left mount plate 34L is provided with a guide shoe 36L secured to the underside thereof in the vicinity of the left side edge thereof. The guide shoe 36L is formed with a groove 37L, which slidably receives a left side edge of the slide plate 16B, as shown in FIG. 2. Also, the left mount plate 34L has a side wall 38L provided along a right side edge thereof, and a lower portion of the side wall 38L is formed as a swollen portion 40L having a through bore for slidably receiving a guide rod 42L.

As shown in FIG. 4, the guide rod 42L extends in the back and forth directions of the slide plate 16B, and the front end thereof is securely supported by the rectangular portion 16B' of the slide plate 16B. Namely, a female thread hole is formed in the front end of the guide rod 42L, and a screw 43L is inserted in the hole 28" (FIG. 3) of the upright fragment 27 and threaded in the female thread hole, so that the front end of the guide rod 42L is fixed to the rectangular portion 16B'.

The rear end of the guide rod 42L is securely supported by the slide plate 16B in a similar way as the above. Namely, as shown in FIG. 3, a projection 49 is projected from a rear end portion of the slide plate 16B, and an upright fragment 49 is formed by bending the projection 48. In FIG. 3, the upright fragment 49 is indicated as a sectional view, and a hole 50 is formed in the upright fragment 49 to align with the hole 28" of the upright fragment 27. A female thread hole is formed in the rear end of the guide rod 42L, and a screw 47L (FIG. 4) is inserted in the hole 50 of the upright fragment 49 and threaded in the female thread hole, so that the rear end of the guide rod 42L is fixed to the rectangular portion 16B'.

Thus, the left mount plate 34L can be moved back and forth along the guide rod 42L, so that the distances from the erecting prism system 32L and the ocular lens system 33L to the objective lens system 31L are adjusted, and thus the left telescopic optical system 30L is focused.

In order to simultaneously move the right and left mount plates 34R and 34L such that a distance between the right and left mount plates 34R and 34L is variable, the mount plates 34R and 34L are interconnected to each other by an expandable coupler 52.

In particular, as shown in FIGS. 5 and 6, the expandable coupler 52 includes a rectangular lumber-like member 52R, and a forked member 52L in which the lumber-like member 52R is slidably received. The lumber-like member 52R is securely attached to the underside of the swollen portion 40R of the sidewall 38R at the forward end thereof, and the forked member 52L is securely attached to the underside of the swollen portion 40L of the side wall 38L at the forward end thereof. Both members 52R and 52L have a length which is greater than the distance of movement of the movable casing section 10B, between its retracted position (FIG. 2) and its maximum extended position. Namely, even though the movable casing section 10B is extended from the retracted position (FIG. 2) to the maximum extended position, slidable engagement is maintained between the members 52R and 52L.

Thus, the simultaneous translational movement of both the mount plates 34R and 34L along the guide rods 42R and 42L can be assured at all times, even if the movable casing section 14B is set to any extended position relative to the main casing section 14A.

Figure 7:
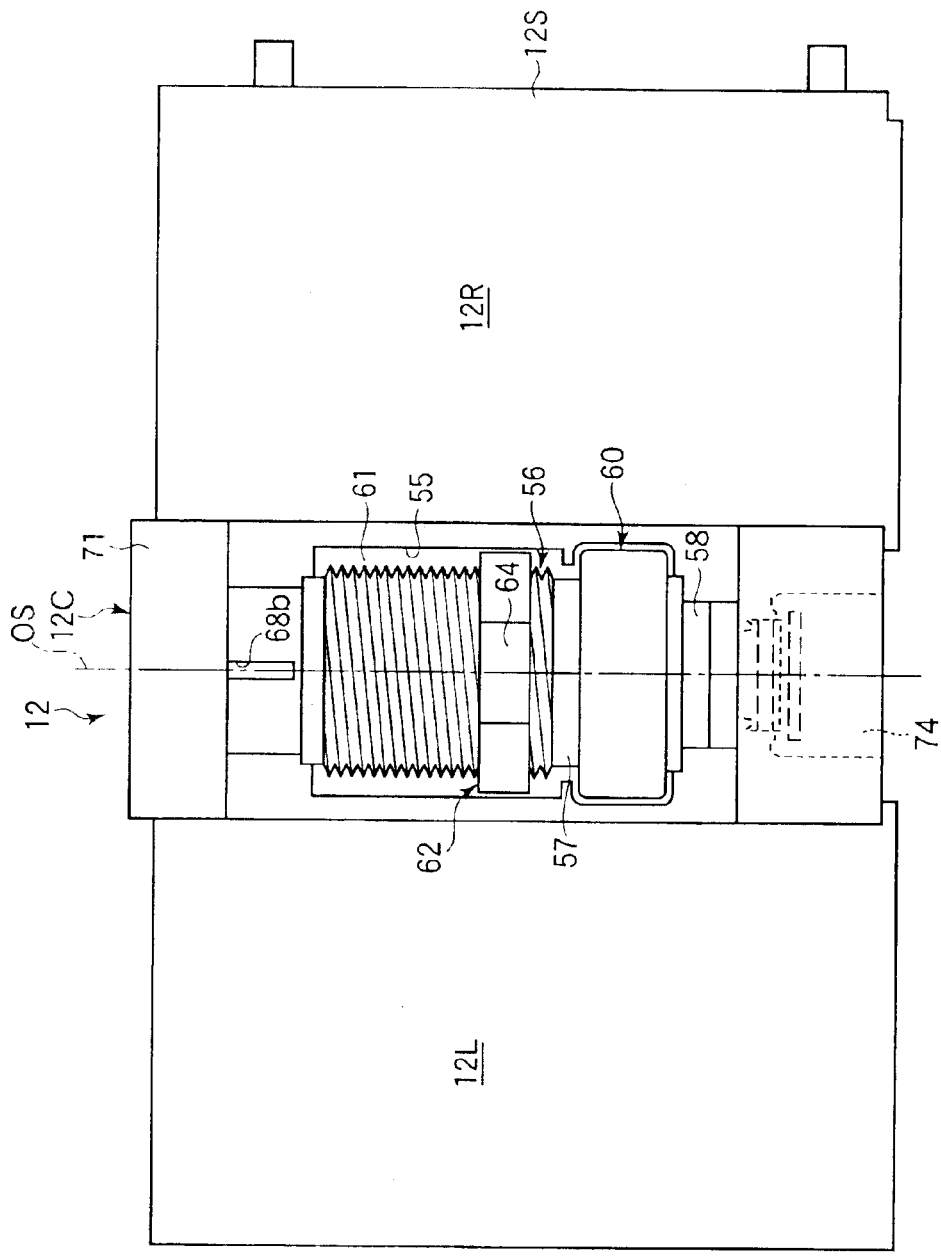
FIG. 7 is a plan view showing the upper frame.
Figure 8:
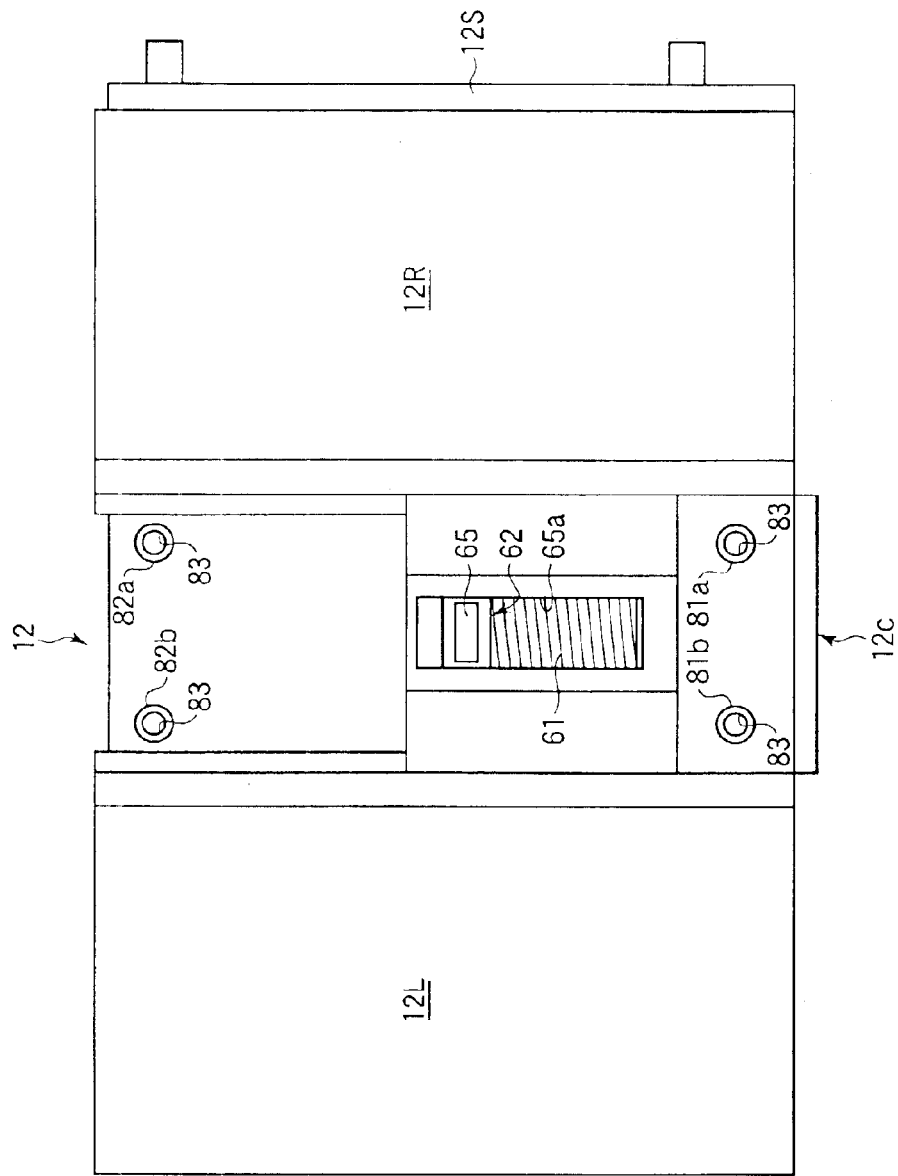
FIG. 8 is a bottom view showing the upper frame.
Figure 9:
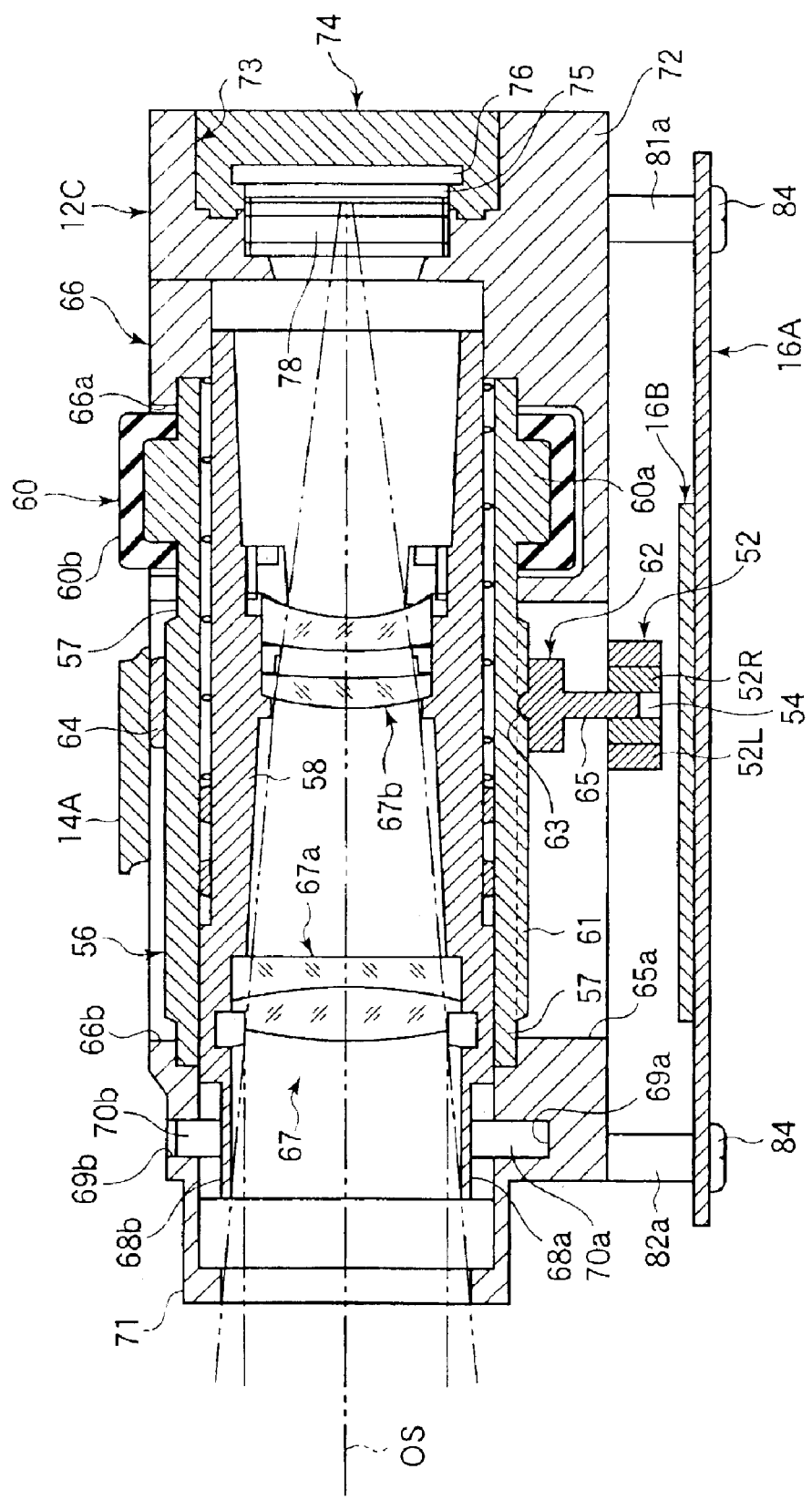
FIG. 9 is a longitudinal sectional view along line IX—IX of FIG. 2.

FIG. 7 is a plan view showing the upper frame 12, and FIG. 8 is a bottom view showing the upper frame 12. FIG. 9 is a longitudinal sectional view along line IX—IX of FIG. 2.

As understood from FIGS. 1, 2, 7, and 8, the upper frame 12 has a central portion or photographing unit 12C, a right wing portion 12R extending from the photographing unit 12C rightward, a vertical wall 12S extending from a right periphery of the right wing portion 12R downward, and a left wing portion 12L extending from the photographing unit 12C leftward. The right wing portion 12R and the left wing portion 12L are integrally connected to the photographing unit 12C, and the vertical wall 12S is integrally connected to the right wing portion 12R. The upper frame 12 is made of appropriate material such as a lightweight alloy and hard synthetic resin. The photographing unit 12C of the upper frame 12 has a recess 55 which has an approximately U-shaped sectional area, and a tubular assembly 56 is provided in the recess 55. As shown in FIG. 9, the tubular assembly 56 has a rotary wheel cylinder 57 and a lens barrel 58 disposed coaxially in the rotary wheel cylinder 57.

As will be described later, the rotary wheel cylinder 57 is rotatably supported in the recess 55, and the lens barrel 58 can be moved along the central axis thereof while the lens barrel 58 is kept still so as not to rotate about the central axis.

A rotary wheel 60 is provided on the rotary wheel cylinder 57. The rotary wheel 60 has an annular projection 60a formed on an outer surface of the rotary wheel cylinder 57, and an annular rubber cover 60b attached on the annular projection 60a. Helicoids 61 are formed on an outer surface of the rotary wheel cylinder 57, and an annular member (i.e., moving element) 62 is threadingly fit on the helicoids 61. Namely, as shown in FIG. 10, three projections 63, engaged with the helicoids 61 of the rotary wheel cylinder 57, are formed on an inner wall of the annular member 62, and disposed at a constant interval.

Figure 10:
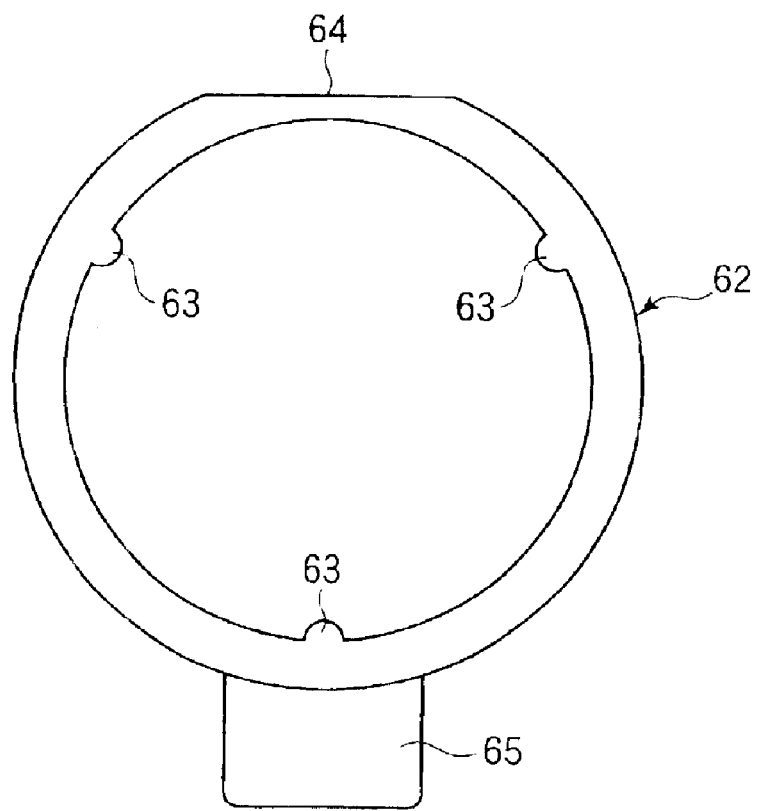
FIG. 10 is a front view showing an annular member engaged with helicoids formed on an outer surface of a rotary wheel cylinder.

Further, as shown in FIG. 10, a flat surface 64 is formed on an outer periphery of the annular member 62, and a tongue 65 is projected from the annular member 62. The flat surface 64 and the tongue 65 are positioned at opposite sides of the annular member 62. As shown in FIG. 8, a rectangular opening 65a is formed in the bottom of the photographing unit 12C of the upper frame 12. When the tubular assembly 56 is housed in the recess 55 of the photographing unit 12C, the tongue 65 of the annular member 62 penetrates the rectangular opening 65a.

In an assembling process of the binocular telescope, when the tubular assembly 56 is housed in the recess 55 of the photographing unit 12C, the recess 55 is partially covered with a curved plate 66, which is curved to fit with an outer surface of the rotary wheel cylinder 57, and a part of the rotary wheel 60 and parts of the helicoids 61 are exposed. Namely, the curved plate 66 has two rectangular openings 66a and 66b, so that the part of the rotary wheel 60 is exposed from the rectangular opening 66a, and parts of the helicoids 61 are exposed from the rectangular opening 66b. Further, when the tubular assembly 56 is housed in the recess 55 of the photographing unit 12C, the annular member 62 is positioned such that the flat surface 64 is exposed from the rectangular opening 66b, as shown in FIG. 9. Note that the curved plate 66 is fixed on the photographing unit 12C with a screw and so on (not shown).

As described above, after the lower frame 10 and the upper frame 20 are assembled as indicated in FIG. 2, the assembled structure is mounted in the casing 14. In this condition, although part of the rotary wheel 60 is exposed through the opening 66a, the rectangular opening 66b is covered by part of the top wall 14A' of the main casing section 14A, and the flat surface 64 is slidably engaged with an inner wall of the top wall 14A'. Therefore, when a user rotates the rotary wheel cylinder 57 by contacting the exposed portion of the rotary wheel 60 with a finger, for example, the annular member 62 is moved along the central axis of the rotary wheel cylinder 57 due to the threading contact with the helicoids 61, since the annular member 62 is prevented from rotating due to the engagement of the flat surface 64 and the top wall 14A'. The moving direction depends on the rotational direction of the rotary wheel cylinder 57.

As shown in FIG. 9, a photographing optical system 67 is provided in the lens barrel 58, and has a first lens group 67a and a second lens group 67b. A pair of key ways 68a and 68b are formed in the front end portions of the lens barrel 58. Each of the key ways 68a and 68b extends by a predetermined length from the front edge of the lens barrel 58 along the optical axis of the photographing optical system 67. A blind hole 69a is formed on a bottom of a front end portion of the U-shaped recess 55. A pin 70a is inserted in the blind hole 69a, and engages with the key way 68a. A through hole 69b is formed in a front end portion of the curved plate 66. A pin 70b is inserted in the through hole 69b, and engages with the key way 68b. Thus, the lens barrel 58 cannot rotate about the central axis thereof, but can be moved along the central axis by a distance corresponding to the length of the pair of key ways 68a and 68b.

A tip portion of the photographing unit 12C is a sleeve 71, which is coaxial with the lens barrel 58. Namely, the central axis of the sleeve 71 is coincident with the optical axis of the photographing optical system 67 housed in the lens barrel 58, and functions as a light entrance mouth to the photographing optical system 67.

A stepped circular opening 73 is formed in a rear end portion 72 of the photographing unit 12C. The central axis of the stepped circular opening 73 is coincident with the optical axis of the photographing optical system 67 in the lens barrel 58. An imaging-device holing member 74 is fit in the stepped circular opening 73, and aligned with the photographing optical system 67. The imaging-device holding member 74 holds an assembly composed of a solid state imaging device such as a CCD 75, and a CCD circuit board 76 controlling an operation of the CCD 75. Further, the imaging-device holding member 74 has an optical low-pass filter 78, which is disposed at a predetermined distance from a light-receiving surface of the CCD 75. Thus, the binocular telescope of this embodiment has the same photographing function as a digital camera, so that an object image obtained by the photographing optical system 67 is formed on the light-receiving surface of the CCD 75 through the optical low-pass filter 76.

In FIGS. 1 and 2, the optical axis of the photographing optical system 67 is indicated by the reference OS, and the optical axes of the right and left telescopic optical systems 30R and 30L are indicated by references OR and OL. The optical axes OR and OL are parallel to each other, and to the optical axis OS of the photographing optical system 67. As shown in FIG. 2, the optical axes OR and OL define a plane P which is parallel to the optical axis OS of the photographing optical system 67. The right and left telescopic optical systems 30R and 30L can be moved parallel to the plane P, so that the distance between the optical axes OR and OL, i.e., an interpupillary distance of a user, can be adjusted.

When the lower frame 10 and the upper frame 12 are assembled as shown in FIG. 2, the central part of the upper frame 12, i.e., the photographing unit 12C is fixed to the rectangular plate 16A of the support-plate assembly 16 of the lower frame 10. For this fixation, as shown in FIG. 3, a pair of holes 79a and 79b are formed along the front edge of the rectangular plate 16A, and a pair of holes 80a and 80b are formed along the rear edge of the rectangular plate 16A. On the other hand, as best shown in FIG. 8, a pair of pins 81a and 81b, separated from each other by the same interval as that of the holes 79a and 79b, are projected from a front bottom of the photographing unit 12C of the upper frame 12, and a pair of pins 82a and 82b, separated from each other by the same interval as that of the holes 80a and 80b, are projected from a rear bottom of the photographing unit 12C of the upper frame 12. The pins (i.e., fixing members) 81a, 81b, 82a, and 82b are formed with threaded holes 83 at the ends thereof, and screws 84 are threadingly fit in the threaded holes 83 through the holes 79a, 79b, 80a, and 80b, so that the upper frame 12 is fixed to the rectangular plate 16A of the support-plate assembly 16.

When the lower frame 10 and the upper frame 12 are assembled as shown in FIG. 2, the tip of the tongue 65 of the annular member 62 is fit in an opening 54 formed in the lumber-like member 52R of the expandable coupler 52, as shown in FIG. 9. Therefore, as described above, when the rotary wheel cylinder 57 is rotated through the rotary wheel 60, so that the annular member 62 is moved along the central axis of the rotary wheel cylinder 57, the right mount plate 34R and the left mount plate 34L are integrally moved with the movement of the annular member 62. Namely, due to the rotation of the rotary wheel 60, the distance from the ocular lens systems 33R and 33L to the objective lens systems 31R and 31L is adjusted, so that the pair of telescopic optical systems 30R and 30L are focused.

When the tip of the tongue 65 is fit in the opening 54, the photographing unit 12C is housed in a recess formed between the pair of telescopic optical systems 30R and 30L, and the optical axis OS of the photographing optical system 67 is positioned close to and at almost the same height as the optical axes OR and OL of the telescopic optical systems 30R and 30L.

In this embodiment, the pair of telescopic optical systems 30R and 30L are designed, for example, in such a manner that, when the distance from each of the objective lens systems 31R and 31L to each of the ocular lens systems 33R and 33L is the shortest, the pair of telescopic optical systems 30R and 30L focus on an object located at a distance between 40 meters ahead of the binocular telescope and infinity, and when observing an object between 2 meters and 40 meters ahead of the binocular telescope, the ocular lens systems 33R and 33L are separated from the objective lens systems 31R and 31L so as to focus on the object. Namely, when the ocular lens systems 33R and 33L are separated from the objective lens systems 31R and 31L by the maximum distance, the pair of telescopic optical systems 30R and 30L focus on an object located at a distance approximately 2 meters ahead of the object.

Thus, in the binocular telescope, a part of a movement-conversion mechanism for converting a rotational movement of the rotary wheel cylinder 57 into a focusing movement of the pair of telescopic optical systems 30R and 30L is provided on side of the lower frame 10, and the other part of the movement-conversion mechanism is provided on a side of the upper frame 12. And when the upper frame 12 is assembled to the lower frame 10, the parts are engaged with each other, so that the movement-conversion mechanism functions.

When the photographing optical system 67 is constructed to be able to perform pan-focus photography in which the photographing optical system 67 focuses an object including a near object, which is situated at a predetermined distance ahead of the binocular telescope, and an object at infinity, and a photographing operation is performed only in the pan-focus photography, a focusing mechanism does not need to be mounted in the lens barrel 58. In the embodiment, however, since the binocular telescope is required to photograph a near object, which is situated less than 2 meters ahead of the binocular telescope similarly to a usual camera, the lens barrel 58 needs to be provided with a focusing mechanism.

Therefore, female helicoids are formed on an inner wall of the rotary wheel cylinder 57, and male helicoids, engaged with the female helicoids of the rotary wheel cylinder 57, are formed on an outer wall of the lens barrel 58. When the rotary wheel 57 is rotated, the lens barrel 58 is moved along the optical axis of the photographing optical system 67, since the lens barrel 58 is prevented from rotating due to the engagement of the key ways 68a and 68b and the pins 70a and 70b. The moving direction of the lens barrel 58 depends upon the rotational direction of the rotary wheel 57. Thus, the helicoids formed on the inner wall of the rotary wheel cylinder 57 and the outer wall of the lens barrel 58 form a movement-conversion mechanism that converts a rotational movement of the rotary wheel 57 into a linear movement or focusing movement of the lens barrel 58.

The helicoids 61 formed on the outer wall of the rotary wheel cylinder 57 and the helicoids formed on the inner wall of the rotary wheel cylinder 57 are inclined in the opposite direction to each other so that, when the rotary wheel cylinder 57 is rotated in such a manner that the ocular lens systems 33R and 33L are separated from the objective lens systems 31R and 31L, the lens barrel 58 is moved to separate from the CCD 75. Due to this, an image of a near object can be focused on the light-receiving surface of the CCD 75. The pitch of the helicoids 61 and the pitch of the helicoids of the inner wall are different from each other in accordance with the optical characteristics of the pair of telescopic optical systems 30R and 30L and the photographing optical system 67.

In the embodiment, the photographing optical system 67 is disposed in the rotary wheel cylinder 57 so that the binocular telescope with a photographing function is constituted compactly. However, the photographing optical system 67 need not be housed in the rotary wheel cylinder 57, and in this case, the rotary wheel cylinder 57 can be a slender solid shaft.

As described above, in the embodiment, the pair of telescopic optical systems 30R and 30L is mounted on the lower frame 10, and the photographing unit 12C is mounted on the upper frame 11. Therefore, the lower frame 10 and the upper frame 11 can be assembled independently, and then combined with each other to obtain the main structure of the binocular telescope with a photographing function. Accordingly, the entire manufacturing process is simplified and the efficiency of the manufacturing process is improved, so that the manufacturing cost is drastically reduced.

Further, in the embodiment, a part of the movement-conversion mechanism for a focusing movement of the pair of telescopic optical systems 30R and 30L is provided on a side of the lower frame 10, and the other part of the movement-conversion mechanism is provided on a side of the upper frame 12, so that, when the lower frame 10 and the upper frame 12 are assembled, both parts are engaged with each other, to constitute the movement-conversion mechanism. Namely, the movement-conversion mechanism having a complex structure is distributed to the lower frame 10 and the upper frame 12. Namely, the difficulties of the assembling process of the lower frame 10 and the upper frame 12 are divided, so that the efficiency of the assembly process of the binocular telescope with a photographing function is improved.

Furthermore, when the photographing optical system 67 is housed in the rotary wheel cylinder 57, the whole structure of the binocular telescope with the photographing function can be constituted compactly. Note that, since the rotary wheel 60 is provided with a relatively large diameter, such that the user can easily rotate the rotary wheel 60 with a finger, the structure for functioning as a binoculars does not become bulky regardless of the size of the rotary wheel cylinder 57 in which the photographing optical system 67 is housed.

Further, according to the embodiment, since the photographing unit 12C is positioned in a recess formed between the pair of the telescopic optical systems 30R and 30L, the binocular telescope can be made thin, and the parallax between an observed image and a photographed image can be reduced.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2002-033384 (filed on Feb. 12, 2002) which is expressly incorporated herein, by reference, in its entirety.

What is claimed is:

1. An assembly structure of a binocular telescope with a photographing function, said assembly structure comprising:
   a lower frame that supports a pair of telescopic optical systems each having an optical axis, said lower frame comprising a support unit assembly, said support unit assembly comprising:
   a first support unit; and
   a second support unit slidably mounted to said first support unit, wherein said first and second support units are relatively linearly movable to adjust the distance between the optical axes of said pair of telescopic optical systems;
   an upper frame that supports a photographing unit containing a photographing optical system; and an engaging mechanism that is provided between said lower frame and said upper frame, said engaging mechanism having a first part provided on a side of said pair of telescopic optical systems and a second part provided on a side of said photographing unit, said first part and said second part being connected by assembling said upper frame onto said lower frame in such a manner that said photographing unit is housed in a recess formed between said pair of telescopic optical systems.

2. An assembly structure according to claim 1, further comprising a rotary wheel rotatably supported by said photographing unit to focus said pair of telescopic optical systems, so that said engaging mechanism is formed as a movement-conversion mechanism for said telescopic optical systems, that converts a rotational movement of said rotary wheel into a focusing movement of said pair of telescopic optical systems.

3. An assembly structure according to claim 2, wherein said first part of said engaging mechanism of said movement-conversion mechanism for said telescopic optical systems comprises support members which are provided on said lower frame to move along the optical axes of said pair of telescopic optical systems, and on which parts of said pair of telescopic optical systems are mounted so that said pair of telescopic optical systems perform said focusing movement, and a connecting mechanism which connects said support members to each other so that said support members are unitedly moved, said first part and said second part of said engaging mechanism of said movement-conversion mechanism for said telescopic optical systems being connected by engaging said second part with said connecting mechanism when assembling said upper frame onto said lower frame.

4. An assembly structure according to claim 3, wherein said second part of said engaging mechanism of said movement-conversion mechanism for said telescopic optical systems comprises a moving element that moves along said optical axes of said pair of telescopic optical systems when said rotary wheel is rotated, said moving element being engaged with said connecting mechanism when assembling said upper frame onto said lower frame.

5. An assembly structure according to claim 3, said support members being provided on said support unit assembly, said connecting mechanism being able to extend and contract in accordance with the relative movement of said said first and second support units.

6. An assembly structure according to claim 5, wherein said photographing unit is provided with a fixing member for fixing said photographing unit to said support unit assembly.

7. An assembly structure according to claim 2, wherein said rotary wheel comprises a rotary wheel cylinder, in which said photographing optical system is housed.

8. An assembly structure according to claim 7, wherein said photographing optical system is mounted in a lens barrel provided in said rotary wheel cylinder, and a movement-conversion mechanism for a photographing optical system, which converts a rotational movement of said rotary wheel cylinder into a focusing movement of said lens barrel to focus said photographing optical system, is provided between said rotary wheel cylinder and said lens barrel.

9. An assembly structure of a binocular telescope with a photographing function, said assembly structure comprising:
   a first frame that supports a pair of telescopic optical systems each having an optical axis, said first frame comprising a support unit assembly, said support unit assembly comprising:
   a first support unit; and
   a second support unit slidably mounted to said first support unit, wherein said first and second support units are relatively linearly movable to adjust the distance between the optical axes of said pair of telescopic optical systems;
   an second frame that supports a photographing unit containing a photographing optical system; and
   an engaging mechanism that is provided between said first frame and said second frame, said engaging mechanism having a first part provided on a side of said pair of telescopic optical systems and a second part provided on a side of said photographing unit, said first part and said second part being connected by assembling said second frame onto said first frame in such a manner that said photographing unit is housed in a recess formed between said pair of telescopic optical systems.

* * * * *